US010034165B2

United States Patent
Betti et al.

(10) Patent No.: US 10,034,165 B2
(45) Date of Patent: Jul. 24, 2018

(54) METHOD OF MANAGING SUBSCRIPTIONS OF USERS IN A MOBILE TELECOMMUNICATIONS NETWORK

(71) Applicant: TELECOM ITALIA S.p.A., Milan (IT)

(72) Inventors: Alessandro Betti, Rome (IT); Laura Maspes, Rome (IT); Fabio Mazzoli, Rome (IT); Patricia Scognamiglio, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/327,298

(22) PCT Filed: Jul. 22, 2014

(86) PCT No.: PCT/EP2014/065660
§ 371 (c)(1),
(2) Date: Jan. 18, 2017

(87) PCT Pub. No.: WO2016/012034
PCT Pub. Date: Jan. 28, 2016

(65) Prior Publication Data
US 2017/0164185 A1 Jun. 8, 2017

(51) Int. Cl.
*H04M 1/66* (2006.01)
*H04W 8/18* (2009.01)
(Continued)

(52) U.S. Cl.
CPC ......... *H04W 8/183* (2013.01); *H04L 65/1016* (2013.01); *H04W 8/26* (2013.01);
(Continued)

(58) Field of Classification Search
CPC .............. H04W 76/10; H04W 8/183
(Continued)

(56) References Cited

U.S. PATENT DOCUMENTS

| 2008/0318551 | A1 | 12/2008 | Palamara et al. | |
| 2012/0096162 | A1* | 4/2012 | Cecilia Torralba | H04W 4/001 709/225 |

FOREIGN PATENT DOCUMENTS

WO 2011/003454 A1 1/2011

OTHER PUBLICATIONS

International Search Report dated Mar. 18, 2015 in PCT/EP2014/065660 filed Jul. 22, 2014.
(Continued)

*Primary Examiner* — Chuck Huynh
(74) *Attorney, Agent, or Firm* — Oblon, McClelland, Maier & Neustadt, L.L.P.

(57) ABSTRACT

A method of managing access of users to services provided by a mobile telecommunications network, including: receiving from a user equipment of a user, which user equipment is capable of supporting communications with the mobile telecommunications network, a request of authentication in the mobile telecommunications network; authenticating the user equipment in the mobile telecommunications network; before the authenticating and in case it is assessed that the authentication request received from the user equipment is the first attempt of that user equipment to register in the mobile telecommunications network, creating, in a network subscribers profiles database, a default subscriber profile for that user equipment, wherein the default subscriber profile includes a predetermined subscriber charging value used by the network for charging the user of the user equipment, and a predetermined Access Point Name.

17 Claims, 5 Drawing Sheets

(51) Int. Cl.
- *H04W 8/26* (2009.01)
- *H04W 76/02* (2009.01)
- *H04W 12/06* (2009.01)
- *H04W 56/00* (2009.01)
- *H04L 29/06* (2006.01)
- *H04W 76/10* (2018.01)

(52) U.S. Cl.
CPC ........... *H04W 12/06* (2013.01); *H04W 56/00* (2013.01); *H04W 76/02* (2013.01); *H04W 76/10* (2018.02)

(58) Field of Classification Search
USPC ...................................... 455/411, 406, 435.1
See application file for complete search history.

(56) References Cited

OTHER PUBLICATIONS

"3$^{rd}$ Generation Partnership Project; Technical Specification Group Services and System Aspects; Architecture enhancements for non-3GPP accesses (Release 12)," 3GPP TS 23.402, V12.5.0, Jun. 2014 (291 pages).

"Pseudo-CR on Change of Subscriber-Status from Mandatory to Optional," 3GPP TSG CT WG4 Meeting #39bis, C4-081920, Jul. 1, 2008 (1 page).

\* cited by examiner

METHOD OF MANAGING SUBSCRIPTIONS OF USERS IN A MOBILE TELECOMMUNICATIONS NETWORK

BACKGROUND OF THE INVENTION

Technical Field of the Invention

The present invention relates in general to the field of telecommunications, and particularly to mobile (e.g. cellular) radio telecommunication networks.

Overview of the Related Art

The 3GPP (an acronym for "Third-Generation Partnership Project") standardization group (Web site: www.3gpp.org) has defined the 4G (fourth generation) UTRAN ("Universal Terrestrial Radio Access Network") LTE ("Long Term Evolution") and SAE ("System Architecture Evolution") network (hereinafter also referred to in short as LTE/SAE network) as the evolution of the 2G/3G (second generation and third generation) mobile communication systems (like the GSM—Global System for Mobile Communications—and the UMTS—Universal Mobile Telecommunications System).

The LTE/SAE network is an all-IP ("Internet Protocol") network that enables fast data services in the packet-switched domain.

The 3GPP has also standardised a fall-back mechanism towards 2G/3G circuit-switched PLMN ("Public Land Mobile Network") networks ("Circuit Switched Fallback Mechanism" or CSFB, described for example in the technical specification 3GPP TS 23.272) to guarantee voice services in the first LTE network deployments.

VoLTE ("Voice over LTE", described for example in GSMA—"GSM Association"—PRD—"Permanent Reference Document"—IR.92) is the target solution for voice services on LTE networks and with Quality of Service (QoS). VoLTE requires the combination of the LTE/SAE network architecture and the IMS ("IP Multimedia Subsystem") system, the latter being described for example in the 3GPP technical specification TS 23.228.

Like profiles of subscribers of the 2G/3G network are loaded in a network database called HLR ("Home Location Register"), the LTE/SAE and IMS network requires the loading of the users' data in a network database (e.g. the HSS—"Home Subscriber Server") that contains the subscription-related information (subscriber profiles), performs authentication and authorization of the users, and can provide information about the subscribers' location.

As discussed in WO 2011/003454, a precondition for a user to get access to LTE/SAE and IMS network services is that the user has previously been "provisioned" in the network, i.e. that the subscriber and related service data has been registered in central databases such as the HSS. Whenever a TLC ("TeLeCommunication") operator wishes to launch a service over an LTE/SAE and IMS network, the TLC operator is unlikely to know exactly which subscribers will wish to make use of that service. The TLC operator has two options: either pre-provision the whole subscribers base in the LTE/SAE and IMS network, or implement some form of autoprovisioning method whereby subscribers can be provisioned as and when they subscribe to the service.

WO 2011/003454 describes solutions to the inefficient licenses management problem. In particular, a method of initiating the provisioning of subscriber data in at least a HSS of an IMS network is disclosed. The method comprises receiving an authentication request or Session Initiation Protocol (SIP) message in respect of a given subscriber who is making use of a user terminal to access the IMS network. If it is determined that subscriber data is not currently provisioned for the subscriber in a HSS function or receiving such a determination, the following steps are performed: 1) causing a first notification to be sent to the user terminal indicating that the registration attempt is rejected, and 2) sending a second notification to a subscriber provisioning system informing the provisioning system of the registration attempt.

SUMMARY OF THE PRESENT INVENTION

The Applicant has observed that since network apparatuses that implement the function of network databases like the HSS are usually sold by the apparatus manufacturers with a total cost that is split between hardware and commercial licenses associated to each user loaded in the network database, each user that is loaded in the network database(s) of a mobile communication network, like the HSS of the LTE/SAE and IMS network, produces a consumption of commercial licenses with associated costs for the TLC operator owner of the network.

An efficient management of the cost of the commercial licenses associated to each user loaded in the network database(s) is generally out of the scope of the standardization committees, like the 3GPP standardization group, thereby the specifications issued by the standardization group, like the 3GPP technical specifications, do not provide any prescription or recommendation on that respect.

The solutions described in WO 2011/003454 do not consider user profile characterization, particularly the proposed solutions do not envisage a management of the specific configurations of the users that are already present in the 2G/3G network databases and that are to be aligned with new 4G network accesses by such users, taking into account the characteristics of the user device (user terminal). In particular, the Applicant has observed that the solutions described in WO 2011/003454 do not consider a user profile characterization is considered, such as:

1. user device (e.g., smartphone, tablet PC, modem) in use;
2. commercial profile subscribed in 2G/3G network;
3. services alignment already subscribed by the user in network databases (2G/3G and 4G, e.g. LTE).

The Applicant has tackled the problem of devising a solution allowing an efficient management of the commercial licenses that manufacturers of network apparatuses for mobile communication networks implementing the function of network databases like the HSS usually sell together with the hardware. Particularly, the Applicant has tackled the problem of devising a solution allowing an efficient use of the licenses associated to each user loaded in network databases like the HSS, and of the related costs.

According to the present invention, in order to have an efficient management of the commercial licenses so as to reduce the costs for a TLC operator, the TLC operator proceeds with the loading of a new user in the mobile communication network database, e.g. in the LTE/SAE and IMS network database, only if the user:

1. has attempted a first registration to the mobile communication network, for example a first registration attempt to a 4G mobile communication network, e.g. an LTE or LTE-A (LTE Advanced) network, or evolutions thereof;

2. has a user device that is capable to connect to the mobile communication network, e.g. is LTE/SAE and IMS capable;

3. is located in a coverage area of the mobile communication network, e.g. in a LTE coverage area or in a neighbouring cell of the 2G/3G network located in proximity of 4G cells, e.g. LTE cells.

This approach guarantees an efficient use of the network (e.g., LTE/SAE and IMS network) database licenses and of the related costs for the TLC operator.

In particular, in an embodiment thereof the present invention provides for:

capturing an event corresponding to an attempt to access the 4G network, e.g. the LTE/SAE network, by a new subscriber which is already a subscriber of the legacy, 2G/3G network/services (i.e., a user whose subscriber profile—i.e., SIM/USIM—is only present in the HLR of the 2G/3G network);

creating a new default profile for the new subscriber having a VoLTE-capable user device (i.e., a user device that is LTE/SAE and IMS capable) in all the network databases of the LTE/SAE and IMS network (e.g. HSS, MMTel—MultiMediaTelephony—server, IMS Presence Server, etc) to enable the new subscriber to the fruition of the new services offered by the LTE/SAE and IMS network;

updating the default profile of the new subscribed on the basis of the subscriber's commercial profile.

According to an aspect thereof, the present invention provides a method of managing the access of users to services provided by a mobile telecommunications network, comprising:

receiving from a user equipment of a user, which user equipment is capable of supporting communications with the mobile telecommunications network, a request of authentication in the mobile telecommunications network;

authenticating the user equipment in the mobile telecommunications network;

before said authenticating and in case it is assessed that the authentication request received from the user equipment is the first attempt of that user equipment to register in the mobile telecommunications network, creating, in a network subscribers profiles database, a default subscriber profile for that user equipment, wherein said default subscriber profile comprises a predetermined subscriber charging parameter used by the network for charging the user of said user equipment, and a predetermined Access Point Name (APN).

The mobile telecommunications network can be a fourth-generation mobile telecommunications network, where by "fourth-generation mobile telecommunications network" it is meant a telecommunications network compliant with the LTE/LTE-A standard and evolutions thereof, or a telecommunications network compliant with the WiMAX standard and evolutions thereof.

For the purposes of the present invention, by Access Point Name it is meant at least an identifier of a Packet Data Network (PDN) that a user of a mobile telecommunications network wants to communicate with. In addition to identifying a PDN, an APN may also be used to define the type of service provided by the PDN (e.g. connection to Wireless Application Protocol—WAP—server, MultiMedia Messaging service—MMS).

Said request of authentication is received through an access network, and said access network can be, for example, either a 3GPP access network or a Non-3GPP access network, particularly a Trusted Non-3GPP access network or an Untrusted Non-3GPP access network.

The method may further comprise, after said request of authentication is received and before said authenticating, assessing if the user equipment is allowed, by an operator of the mobile telecommunications network, to operate in the mobile telecommunications network, wherein said assessing is based on IMEI identities associated to the user equipment.

The method may further comprise, after said authenticating, establishing a data connection with the user equipment using the predetermined subscriber charging parameter and the predetermined Access Point Name contained in the default subscriber profile.

Said establishing a data connection with the user equipment may comprise:

receiving a data connection request from the user equipment, assessing whether the subscriber profile associated with the user of the user equipment is a default subscriber profile, and in the affirmative case overriding an Access Point Name included in the received data connection request with the predetermined Access Point Name, accepting the data connection request and enabling the user device to access a data network through the default Access Point Name.

Said assessing whether the subscriber profile associated with the user of the user equipment is a default subscriber profile may comprise assessing whether the charging parameter associated with said user corresponds to the predetermined charging parameter.

In case the charging parameter associated with said user does not correspond to the predetermined charging parameter, the Access Point Name included in the received data connection request may be not overridden.

The method may further comprise, after having assessed that the subscriber profile associated with the user of the user equipment is a default subscriber profile, sending to the user equipment a notification to inform the user of the user equipment about the subscription to services offered by the mobile telecommunications network.

Said assessing whether the subscriber profile associated with the user of the user equipment is a default subscriber profile is preferably not performed in case it is assessed that the user equipment is connected to a 3GPP access network different from a fourth-generation access network.

The method may further comprise, in case it is assessed that the user equipment is connected to a 3GPP access network different from a fourth-generation access network, assessing whether the user equipment is a fourth-generation-capable equipment, and, in the affirmative case, creating an entry for the user equipment in the network subscribers profiles database.

Said assessing whether the user equipment is a fourth-generation-capable equipment may comprise assessing whether the user equipment is connected to a cell, of the 3GPP access network different from a fourth-generation access network, being adjacent or near to a cell of a fourth-generation access network.

The method may further comprise, after said establishing a data connection with the user equipment, managing a Web browsing session request of the user equipment, wherein said managing the Web browsing session comprises:

receiving from the user equipment a request to start a Web browsing sessions;

assessing whether the request from the user equipment contains the predetermined Access Point Name, and in the affirmative case, issuing to the user equipment a request for the user to accept the services provided by the mobile telecommunications network;

if the user accepts the services provided by the mobile telecommunications network, updating the default subscriber profile for the user equipment according to a subscriber profile for the user of the user equipment already assigned for mobile telecommunications networks other than the considered (e.g., fourth-generation) mobile telecommunications network, otherwise, if the user does not accept the services provided by the considered (e.g., fourth-generation) mobile telecommunications network, replacing the predetermined subscriber charging parameter with a subscriber charging parameter already assigned for mobile telecommunications networks other than the considered (e.g., fourth-generation) mobile telecommunications network.

The method may further comprise, if the user accepts the services provided by the mobile telecommunications network, e.g. fourth-generation network, requesting to an IP Multimedia Subsystem IMS to subscribe the user in the IP Multimedia Subsystem IMS, or to update an already existing user IMS profile, for being provisioned the services provided by the fourth-generation network.

According to another aspect thereof, the present invention provides a mobile telecommunications network, comprising a network subscribers profiles database configured for:

upon receipt, from a user equipment of a user, which user equipment is capable of supporting communications with the mobile telecommunications network, of a request of authentication in the mobile telecommunications network, before authenticating the user equipment in the mobile telecommunications network and in case it is assessed that the authentication request received from the user equipment is the first attempt of that user equipment to register in the mobile telecommunications network, creating, in the network subscribers profiles database, a default subscriber profile for that user equipment, wherein said default subscriber profile comprises a predetermined subscriber charging parameter used by the network for charging the user of said user equipment, and a predetermined Access Point Name.

The mobile telecommunications network may comprise an access network through which said request of authentication is received, wherein said access network may comprise at least one of a 3GPP access network and a Non-3GPP access network, particularly a Trusted Non-3GPP access network or an Untrusted Non-3GPP access network.

The network may comprise an Authorization, Authentication and Accounting network function for establishing a data connection with the user equipment using the predetermined subscriber charging parameter and the predetermined Access Point Name.

Said Authorization, Authentication and Accounting network function is configured for assessing whether the subscriber profile associated with the user of the user equipment is a default subscriber profile, and in the affirmative case overriding an Access Point Name included in the received data connection request with the predetermined, default Access Point Name.

For said assessing whether the subscriber profile associated with the user of the user equipment is a default subscriber profile the Authorization, Authentication and Accounting network function may be configured for assessing whether the charging parameter associated with said user corresponds to the predetermined charging parameter.

The mobile telecommunications network may comprise a network function, particularly a Diameter Proxy, configured for assessing whether the user equipment is allowed, by an operator of the mobile telecommunications network, to perform authentication in the mobile telecommunications network.

BRIEF DESCRIPTION OF THE DRAWINGS

These and other features and advantages of the present invention will be made apparent by the following detailed description of exemplary, non-limitative embodiments thereof, description that will be conducted making reference to the annexed drawings, wherein.

DETAILED DESCRIPTION OF EXEMPLARY EMBODIMENTS OF THE PRESENT INVENTION

Figure 1:
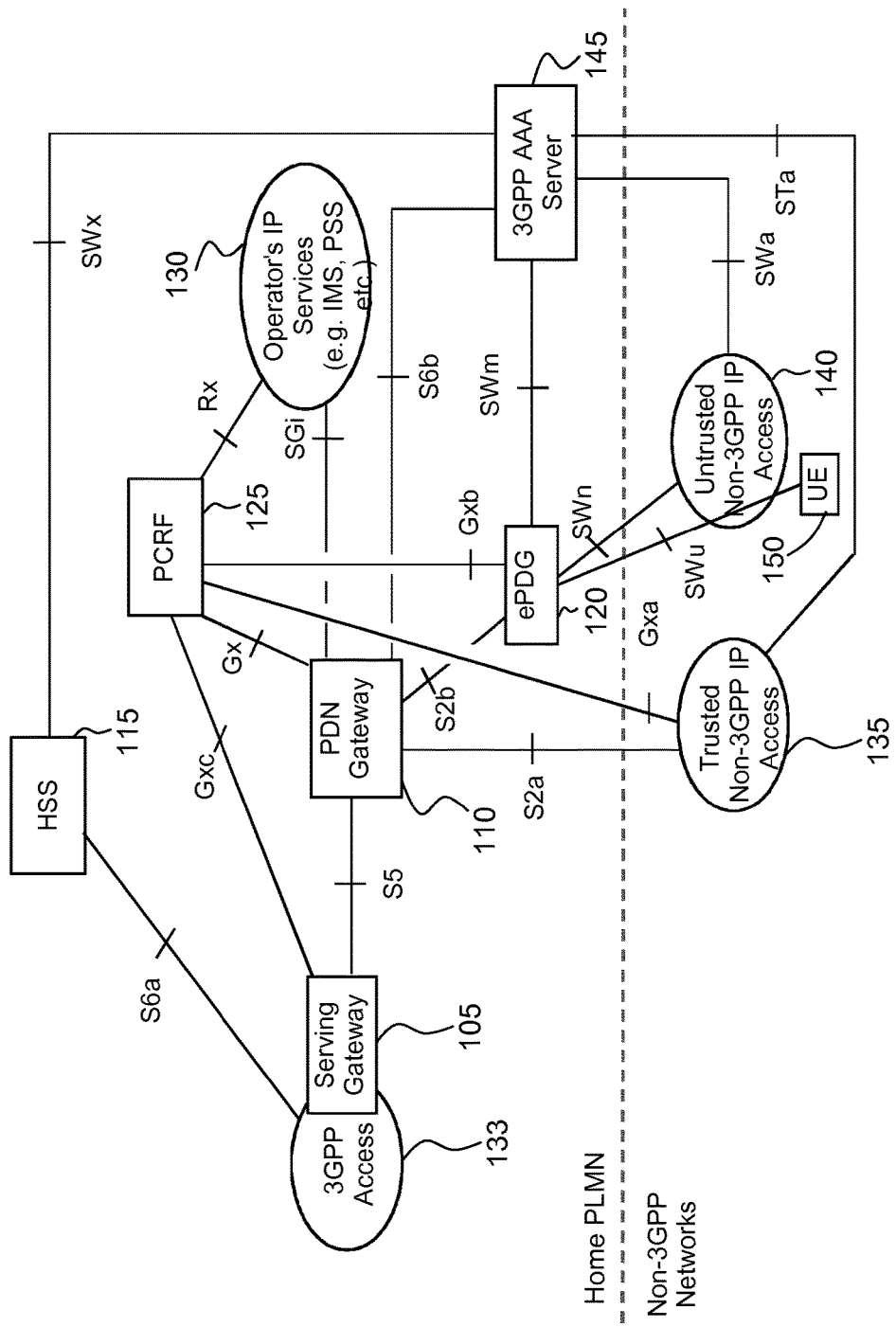
FIG. 1 schematically shows some of the functional entities of an LTE/SAE network, relevant to the present invention.

FIG. 1 summarises the relevant functional entities of an LTE/SAE network, as defined in the 3GPP Technical Specification TS 23.402.

The LTE/SAE network comprises: on the core network side, an EPC ("Evolved Packet Core") network portion; on the radio access network side, a 3GPP E-UTRAN ("Evolved-Universal Mobile Telecommunications System Terrestrial Radio Access Network") access network portion and a Non-3GPP access network portion.

The 3GPP Technical Specification TS 23.002 gives an overview of the architecture of the 3GPP system. In particular, the 3GPP Technical Specification TS 23.002 describes all the network elements used in the EPC network portion. The EPC network portion comprises the following network elements: a Serving Gateway (Serving GW) 105, a PDN ("Packet Data Network") Gateway (PDN GW) 110, a HSS ("Home Subscriber Server") 115, an ePDG ("evolved Packet Data Gateway") 120, a PCRF ("Policy and Charging Rules Function") 125.

The EPC is connected to external IP Packet Data Networks (PDNs) 130, which can include an IMS ("IP Multimedia core network Subsystem") infrastructure, a PSS ("Packet Switched Streaming") service infrastructure, etc.

The Serving GW 105 and the PDN GW 110 deal with the user plane. They transport the IP data traffic between a User Equipment (UE) and the external networks.

The Serving GW 105 is the point of interconnection between the 3GPP radio access network side and the EPC. The Serving GW 105 serves the UE by routing the incoming and outgoing IP packets.

The PDN GW 110 is the point of interconnection between the EPC and the external IP PDNs 130. The PDN GW 110 routes packets to and from the external PDNs 130. The PDN GW 110 also performs various functions such as IP address/IP prefix allocation or policy control and charging.

The PCRF 125 is the core network node designated in real-time to determine policy rules in a multimedia network.

The 3GPP Technical Specification TS 23.401 defines the architecture of the 3GPP E-UTRAN (i.e., 3GPP) access network portion 133, and the 3GPP TS 23.402 defines the architecture enhancements for Non-3GPP accesses (i.e., accesses to the EPC network portion through Non-3GPP access technologies, i.e. access technologies different from the 3GPP RAN, like the GSM RAN, the UTRAN and the E-UTRAN).

Non-3GPP accesses can be split in two categories: "Trusted Non-3GPP IP Accesses" 135 and "Untrusted Non-3GPP IP Accesses" 140. Trusted Non-3GPP accesses 135 can interact directly with the EPC (via the PDN GW 110 and the PCRF 125). Untrusted Non-3GPP accesses 140 interwork with the EPC via the ePDG 120. The ePDG 120 provides security mechanisms, such as IPsec tunneling, for establishing connections with UEs 150 over an Untrusted Non-3GPP access.

The HSS 115 (for the 3GPP accesses 133), and the PDN GW 110 and the ePDG 120 (for the Trusted Non-3GPP accesses 135 and the Untrusted Non-3GPP accesses 140, respectively) exploit the functions of a 3GPP AAA ("Authorization, Authentication and Accounting") server 145 that performs AAA functions.

The various functional entities communicate with each other over standard interfaces (like the interfaces S2a, S2b, S5, S6a, S6b, Gx, Gxa, Gxb, Gxc, SGi, Rx, SWa, SWm, SWn, SWu, STa, SWx) that are not described in further detail being known to the person skilled in the art.

Figure 2:
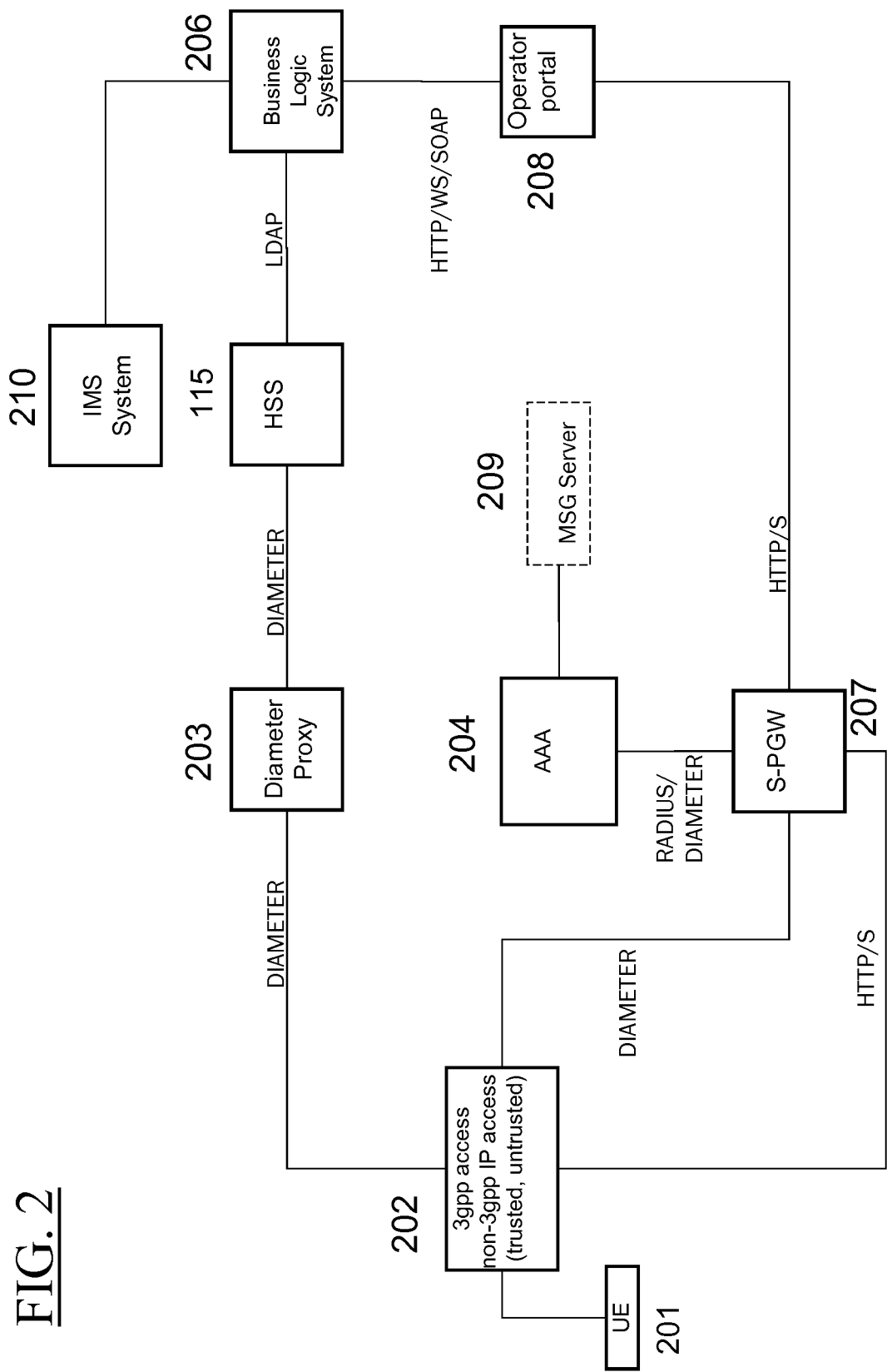
FIG. 2 depicts the relationships among the relevant functional entities of the LTE/SAE network of FIG. 1.

FIG. 2 depicts the relationships among the relevant functional entities of the LTE/SAE network of FIG. 1.

UE 201 is the user device. Block 202 schematizes 3GPP (LTE or 2G-3G) access 133 or Non-3GPP IP access (Trusted Non-3GPP IP access 135 and Untrusted Non-3GPP IP access 140), and represents all the functional elements of an LTE/SAE network access involved in the establishment and management of a data session between the EPC core network portion and a UE 201. Examples of such functional elements are eNodeB ("evolved NodeB") and MME ("Mobility Management Entity") involved in 3GPP accesses 133, and Access Gateway (AG) and WLAN Access Network Gateway (Trusted Wireless Access Gateway or TWAG) involved in Untrusted Non-3GPP IP accesses 140 and Trusted Non-3GPP IP accesses 135, respectively.

SAE gateway (S-PGW) 207 comprises two different gateways: the Serving GW 105 that routes and forwards user data packets and manages user mobility, and the PDN GW 110 that manages the interconnection with other IP Packet Networks 130. This elements are part of the EPC described in the 3GPP Technical Specification TS 23.002.

The HSS 115 contains user subscription-related information (also known as subscriber profiles) and user data for authentication and authorization procedures. The HSS 115 can also provide information about the users' location. Also this network element is part of the EPC described in the 3GPP Technical Specification TS 23.002.

A Diameter Proxy (DP) 203 is an optional element in LTE/SAE network specified in the 3GPP Technical Specifications TS 29.213, TS 29.272 and TS 23.402. The DP 203 is an element able to control DIAMETER protocol (which is an Authentication, Authorization and Accounting protocol) signalling according to operator's policies. For example, the DP 203 is used to reduce network elements interconnection complexity, to implement topology hiding, to optimize the transport level, to modify DIAMETER protocol message content.

The (3GPP) AAA server 204 is the network entity that usually provides the functions of Authentication, Authorization and Accounting of the users in an IP data network like the LTE/SAE network. Technical details of the AAA server 204 are not described further here, being known to the person skilled in the art, and being described in specific RFCs ("Request For Comments") like RFC 2865, RFC 2866, 3GPP TS 29.061.

Block 210 schematizes the IMS system ("IP Multimedia Subsystem") network, described for example in the 3GPP Technical Specification TS 23.228. The IMS system is a standardized IP-based architecture that allows the convergence of fixed and mobile communication services using SIP (Session Initiation Protocol) protocol. The IMS system 210 comprises inter alia the following network elements:

1. an IMS HSS ("Home Subscriber Server"), a database that contains IMS user subscription-related information (also known as IMS subscriber profiles);

2. an SLF ("Subscription Locator Function"), a database that contains IMS user address when multiple HSSs are used in network;

3. DNS/ENUM ("Domain Name Server/tElephone NUmber Mapping"), a database that contains resolution of an ENUM telephone number into a SIP URI, routable in IMS system;

4. P/I/S-CSCF ("Proxy/Interrogating/Serving-Call Session Control Function"), SIP servers used to process SIP signalling packets in the IMS system;

5. BGCF ("Breakout Gateway Control Function"), a SIP proxy able to routing requests to CS network. It has a database of users enabled to be reachable to CS network;

6. MMTEL AS ("Multi Media TELephony Application Server"), a SIP server for managing user Supplementary Services (SS) such as Call Diversion, Call Waiting, Call Hold, etc. It has a database of IMS users that contains SS subscribed by the user;

7. Mediation platform, an element that receives the IMS provisioning request and inserts user entry in all databases of IMS system (such as HSS, SLF, BGCF, DNS/ENUM, MMTEL AS).

Always with reference to FIG. 2, three additional functional elements are shown, not specified in the 3GPP Technical Specifications, that are typically comprised in a TLC operator infrastructure:

1. Business Logic System (BLS) 206, that ideally represents all the platforms and the applications that a TLC operator normally uses to manage the provisioning and the charging of the users of the own network (by "charging" it is intended the operation of documenting of the network traffic, necessary for the billing to the users);

2. Operator Web Portal 208 that ideally represents all the platforms and the applications that a TLC operator normally uses for offering a Web interface to the customers, buying and managing subscription and\or for advertising purposes, and 3. Messaging Server (MSG Server) 209, an optional element for the present invention, that is used to send notifications to the user via Short Message Service (SMS) and/or a Multimedia Message Service (MMS).

A user, for accessing LTE services, should:

1) have a subscriber profile in the LTE network database (e.g. the HSS 115), i.e. he/she should be provisioned in the LTE network;

2) have a LTE-capable device (denoted as "LTE device" in the following), and 3) be located in or near to a LTE coverage area.

The present invention relates to a method for managing the first attempt of registration on a mobile telecommunications network, such as a fourth-generation cellular network like a LTE/SAE network via 3GPP access 133 or non-3GPP IP access 135 or 140 of a LTE-capable device (UE 201) owned by a user who is not yet provisioned in the LTE network, avoiding a-priori provisioning activities.

In the following of the description for "not provisioned user" it is intended a user whose profile is not loaded on a LTE network database, and for "a-priori provisioning activities" it is intended a process that provides the user configuration on the LTE network database regardless of whether the user will use LTE services or not.

According to an embodiment of the present invention, the following functionalities of the above-described network elements are exploited:

a) Diameter Proxy 203 functionality (as described below), and b) auto-provisioning functionality of the HSS 115 that enables creation of default LTE subscriber profiles in the LTE network database 115 to guarantee user registration on the LTE/SAE network.

The auto-provisioning functionality is triggered when a user does a first registration attempt under the following conditions:

the user has a user device (UE 201) that is LTE/SAE and IMS capable, and the user UE is located in a LTE coverage area or in a neighboring cell of a 2G/3G network.

Figure 3:
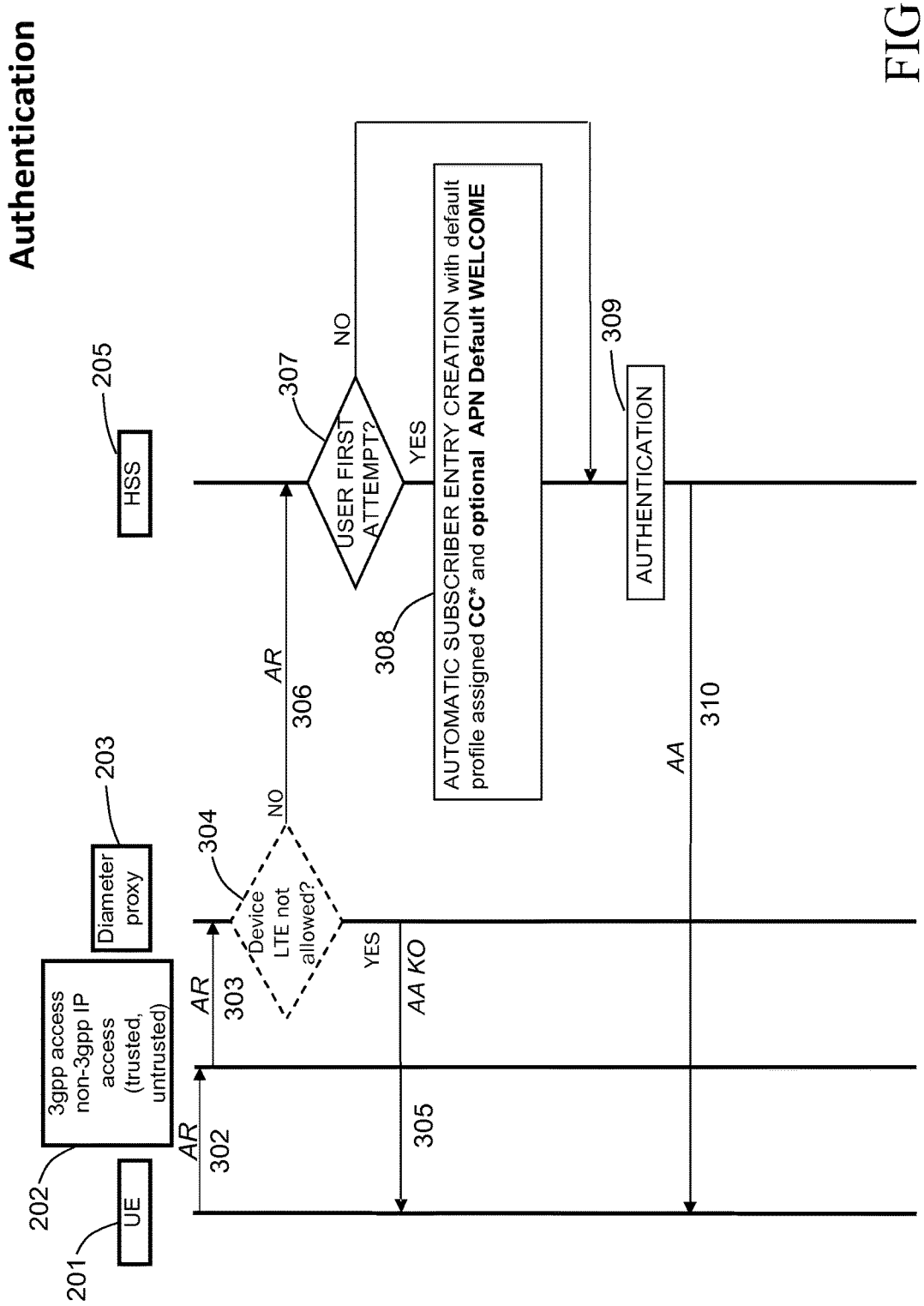
FIG. 3 schematically shows the activities of, and messages flow among, the functional entities of FIG. 2 for performing an authentication procedure of a user device that attempts a first registration on the LTE/SAE network, according to an embodiment of the present invention.

FIG. 3 shows the messages flow among the different functional elements of FIG. 2 for performing an authentication procedure of a UE 201 that attempts a first registration on the LTE/SAE network, according to an embodiment of the present invention.

Specifically, at step 302 the UE 201 of a generic user sends an Authentication Request (AR) message to the 3GPP access or Non-3GPP IP access 202, the AR message containing specific information (i.e. AVP, "Attribute-Value Pair") comprising, for example, the IMEI ("International Mobile Equipment Identity"), a numerical code that univocally identifies that UE 201. The AR message can be an Authentication-Information-Request—AIR—message sent over the S6a interface or a Multimedia-Authentication-Request—MAR—message sent over the Swx interface: in a 3GPP access (133 of FIG. 1) scenario the AR message corresponds to the Authentication Information Request (AIR) described in the 3GPP Technical Specification TS 29.272, whereas in a Non 3GPP access (135 or 140 of FIG. 1) scenario the AR message corresponds to the Multimedia Authentication Request (MAR) described in the 3GPP Technical Specification TS 29.273.

The AR message is received at the 3GPP access or Non-3GPP IP access 202. At step 303, the Diameter Proxy 203 receives the AR message forwarded thereto by the 3GPP access or the Non-3GPP IP access 202.

According to an embodiment of the present invention, a check is optionally performed at step (decision block) 304, for preliminarily checking if the UE 201 sending the AR message is a device that the TLC operator wishes to enable or not to the LTE network. The check may be performed by analysing the AVP that contains the IMEI information. For performing the check at step 304, the Diameter Proxy 203 should be provided with a logic configured for interrogating a database (not shown in the drawings) that should be created for example internally to the Diameter Proxy 203 or in the Business Logic System (BLS) 206. Such database can contain entries, each one corresponding to an IMEI value associated to a device that the TLC operator wishes to block for the use of the LTE technology (in the following denoted as "device not allowed"). The database can be populated with all the IMEIs commercialised by the TLC operator that are associated to devices not allowed. In this scenario, in order to remove the condition "device not allowed" for a specific UE, the TLC operator shall delete the related IMEI from the database.

If, at step 304, the Diameter Proxy 203 assesses that the UE 201 is a "device not allowed" (exit branch YES of decision block 304), then at step 305 the Diameter Proxy 203 sends to the UE 201 an AA (Authentication Answer) KO message (the AA OK message may be sent as an Authentication-Information-Answer—AIA—over the S6a interface or as a Multimedia-Authentication-Answer—MAA—over the Swx interface) with a Result-Code AVP failure, indicating that the authentication request has been unsuccessful. Consequently, the UE 201 is not authenticated by the LTE network and it cannot establish a data connection with it. Anyway, a UE 201 registered in the network database as a "device not allowed", after an unsuccessful authentication on LTE, can establish a data connection with the legacy 2G/3G network, if the UE 201 is located in a 2G/3G coverage area.

If, at step 304, the Diameter Proxy 203 assesses that the UE 201 is not registered in the network database in the Diameter Proxy 203 or in the Business Logic System (BLS) 206 as a "device not allowed", i.e. the UE 201 is a device allowed, not blocked by the TLC operator for the use of the LTE technology (exit branch NO of decision block 304), then at step 306 the Diameter Proxy 203 sends the AR message to the HSS 115.

If the optional check at step 304 is not performed, then upon receipt, at step 303, of the AR message, the Diameter Proxy 203 forwards the AR message directly to the HSS 115.

At step (decision block) 307 the HSS 115 verifies if the user (UE 201) is at his/her first attempt of registration on the LTE network. In the affirmative (exit branch YES of decision block 307) the HSS 115, using the above cited auto-provisioning feature, automatically creates (step 308) in the HSS database 115 a default LTE subscriber profile using information contained in the AR message, such as User-Name AVP for user identity (e.g. the IMSI, International Mobile Subscriber Identity).

The HSS 115 then proceeds to step 309 to authenticate the UE 201 according to the standard mechanisms described for example in the 3GPP Technical Specifications TS 33.401 and TS 33.102.

In the negative case, i.e. if the user of the UE 201 is not at his/her first attempt, being already provisioned in the HSS 115 (exit branch NO of decision block 307), then the HSS 115 directly proceeds to authenticate the user UE 201 according to the standard mechanisms cited above (step 309).

At step 310, the HSS 115 sends to the UE 201 an Authentication Answer AA message with a Result-Code AVP indicative of the fact that the user authentication is successfully completed. In a 3GPP access 133 scenario the AA message corresponds to an Authentication-Information-Answer (AIA) described in the 3GPP Technical Specification TS 29.272, whereas in a Non-3GPP access 135 or 140 scenario it corresponds to a Multimedia-Authentication-Answer (MAA) described in the 3GPP Technical Specification TS 29.273.

With reference to step 308 just described, the default LTE subscriber profile that is created by the HSS 115 at the first attempt of registration of a user device on the LTE network contains specific parameters to:

1) recognize the auto-provisioned user:
   a. 3GPP-Charging Characteristics with associated AVP value "CC*". This AVP is used to generate subscriber charging information.
   b. default APN with associated value "APN WELCOME". This Access Point Name is chosen by the TLC operator to access data network for auto-provisioning purposes.
2) define a service level that the TLC operator should offer to its own users, for example (the list is provided only for example and it is not intended to be exhaustive):
   a. QoS Class Identifier (QCI) specifying the treatment of IP packets sent/received for service class, in terms of priority, packet loss, packet delay etc. The 3GPP Technical Specification TS 23.107 defines the following service classes: conversational (for voice applications), streaming (for video streaming applications), interactive (for web browsing applications), background (for electronic mail).
   b. Aggregate Maximum Bit Rate (AMBR) and Maximum Bit Rate (MBR) indicating the maximum bandwidth in bits per second supported by the network respectively for user and APN in uplink/downlink IP flow.

According to an embodiment of the present invention, the default LTE subscriber profile contains a specific value "CC*" for the 3GPP-Charging Characteristics and a default APN "APN WELCOME" dedicated to auto-provisioning purposes. The TLC operator can choose whether the default APN "APN WELCOME" is a new APN or the default APN is one of the APNs already defined in the TLC operator network.

Figure 4:
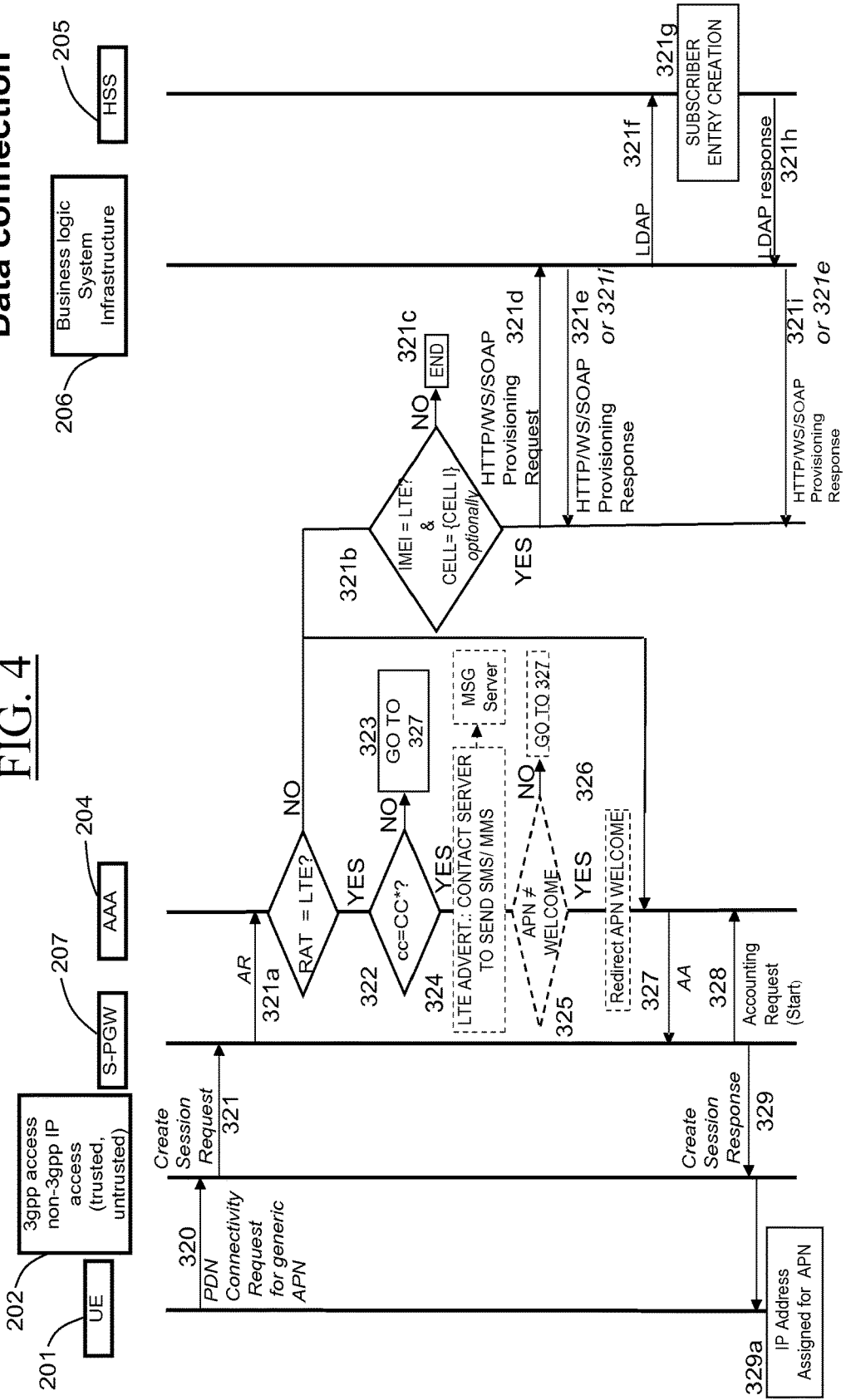
FIG. 4 schematically shows the activities of, and messages flow among, the functional entities of FIG. 2 for establishing a data connection in respect of the user device, according to an embodiment of the present invention, and FIG. 5 schematically shows the activities of, and messages flow among, the functional entities of FIG. 2 to manage a Web browsing session request coming from the user device, according to an embodiment of the present invention.

FIG. 4 shows the messages flow for establishing a data connection according to an embodiment of the present invention. The data connection is established between a UE 201, authenticated according to the procedure shown in FIG. 3, and the LTE/SAE network.

With reference to FIG. 4, at step 320 the 3GPP (LTE or 2G-3G) or Non-3GPP IP access network 202 receives from the UE 201 a PDN Connectivity Request message (described for example in the 3GPP Technical Specifications TS 24.301, TS 23.401 and TS 29.274) for a generic APN.

At step 321, the 3GPP (LTE or 2G-3G) or Non-3GPP IP access network 202 sends a Create Session Request message (described for example in the 3GPP Technical Specifications TS 29.274, TS 23.401) to the S-PGW 207 in order to start a data session. Both the PDN Connectivity Request message and the Create Session Request message contain information such as:

3GPP-Charging Characteristics received by the UE 201 during the authentication procedure of FIG. 3;
   requested APN, chosen by the user or, if absent, indicated by the network (i.e., default APN "APN WELCOME");
   RAT and cell identifier, captured by the UE 201 on radio access;
   UE 201 IMEI, indicating the type of device.

After having received the Create Session Request message, at step (decision block) 321*a* the S-PGW 207 sends an AR message to the AAA server 204 containing information extracted from the Create Session Request message, such as 3GPP-Charging Characteristics, requested APN, RAT, cell identifier, IMEI. In particular, as already described above, according to an embodiment of the present invention, a specific value of the 3GPP-Charging Characteristics (the CC* value) identifies the UE 201 as an auto-provisioned user by the HSS 115 at the first registration attempt.

Then, the AAA server 204 verifies the received information, as described here below.

If the AAA server 204 verifies that the RAT is LTE (exit branch YES of decision block 321*a*), at step (decision block 322) the AAA server 204 also analyses the 3GPP-Charging Characteristics to verify if they are set equal to the CC* value.

If the 3GPP-Charging Characteristics are not equal to the CC* value (exit branch NO of decision block 322) the AR message is directly acknowledged by the AAA server 204 by sending an AA message to the S-PGW 207 (steps 323 and 327).

Otherwise, if the 3GPP-Charging Characteristics are equal to the CC* value (exit branch YES of decision block 322), (meaning that the UE 201 user is an auto-provisioned user by the HSS 115 at a first registration attempt), the AAA server 204 may optionally send (step 324) an alert message to the BLS 206 so as to trigger an SMS and/or MMS advertising message, via the MSG server 209, to inform the UE 201 about the subscription to LTE commercial services.

At step (decision block) 325, the AAA server 204 verifies the APN requested by the user (denoted as "requested APN" in the following).

If the AAA server 204 verifies that the requested APN is equal to an "APN WELCOME" (exit branch NO of decision block 325), the AAA server 204 directly sends an AA message to the S-PGW 207 (step 327).

Otherwise, if the AAA server 204 verifies that the requested APN is not equal to an "APN WELCOME" (exit branch YES of decision block 325), then, according to an embodiment of the present invention, the AAA server 204 starts an APN redirection procedure (step 326). Specifically, the AAA server 204 sends to the S-PGW 207 an AA message (step 327) including information regarding the "APN WELCOME" to be used. This information is used by the S-PGW 207 to force the UE 201 on the "APN WELCOME".

Once the S-PGW 207 receives (at step 327) the AA message, the S-PGW 207, at step 328, sends an Accounting Request (start) message to the AAA server 204 in order to notify the starting of the data session.

Then, at step 329, the S-PGW 207 sends a Create Session Response message as described in the 3GPP Technical Specifications TS 29.274, TS 23.401 and TS24.301 to the 3GPP (LTE or 2G-3G) or Non-3GPP IP access networks 202 so as to complete the establishment of the data session between the UE 201 and the LTE/SAE network. In particular, to complete the establishment of the data connection an IP address is assigned at step 329*a* to the UE 201 in order to access the LTE network via the APN WELCOME if the user is an auto-provisioned user, or via the requested APN if the user is an already provisioned user.

The UE 201 is now able to start a Web browsing session towards a generic Uniform Resource Locator (URL) or using a URL received at step 324 via SMS or MMS on the LTE network.

Back to step 321*a*, if the AAA server 204 identifies that the RAT is not LTE, being a 2G-3G RAT (exit branch NO of decision block 321*a*), the AAA server 204 sends directly to the S-PGW 207 an AA message (step 327) including information regarding the APN requested by the UE 201.

In addition, at step (decision block) 321*b* the AAA server 204 also analyses other information contained in the AR message, such as IMEI and cell ID, for comparing them with information stored in its own database or in other TLC operator databases. The TLC operator can decide to create a LTE subscription profile if the UE 201 is a LTE-capable device and, optionally, if the UE 201 is covered by a 2G/3G cell adjacent/near to an LTE coverage area.

If the AAA server 204 verifies that the IMEI and the cell ID received in the AR message are not in the database (exit branch NO of decision block 321b) the AAA server 204 ends the procedure (step 321c), otherwise (exit branch YES of decision block 321b) the AAA server 204 notifies this event to the BLS 206 (step 321d) by sending a HTTP/WS/SOAP Provisioning Request message to the BLS 206 including information related to the UE 201 (e.g. MSISDN, IMSI).

At this stage, the BLS 206 can send a response message to the AAA server 204:
- immediately (at step 321e), to release AAA server 204 resources as soon as possible (for resources saving);
- optionally (step 321i), at the end of the procedure for creating an entry subscription in the HSS 115. In this second case the AAA server 204 resources remain engaged for more time than in the previous case but with the advantage of being sure that the subscription in the HSS 115 has been completed.

At step 321f the BLS 206 verifies in its own database if the MSISDN of which a subscription is requested can be enabled to LTE subscription according to the TLC operator policies (e.g. first registration attempt, profile's type). In the affirmative case, the BLS 206 requires a subscription entry to the HSS 115 via LDAP (Lightweight Directory Access Protocol) and waits for a response (step 321g and step 321h).

Optionally the BLS 206 can send notifications via Short Message System (SMS) and/or Multimedia Message System (MMS) to the UE 201 so as to inform the user that its UE 201 is now configured to use LTE commercial services.

Figure 5:
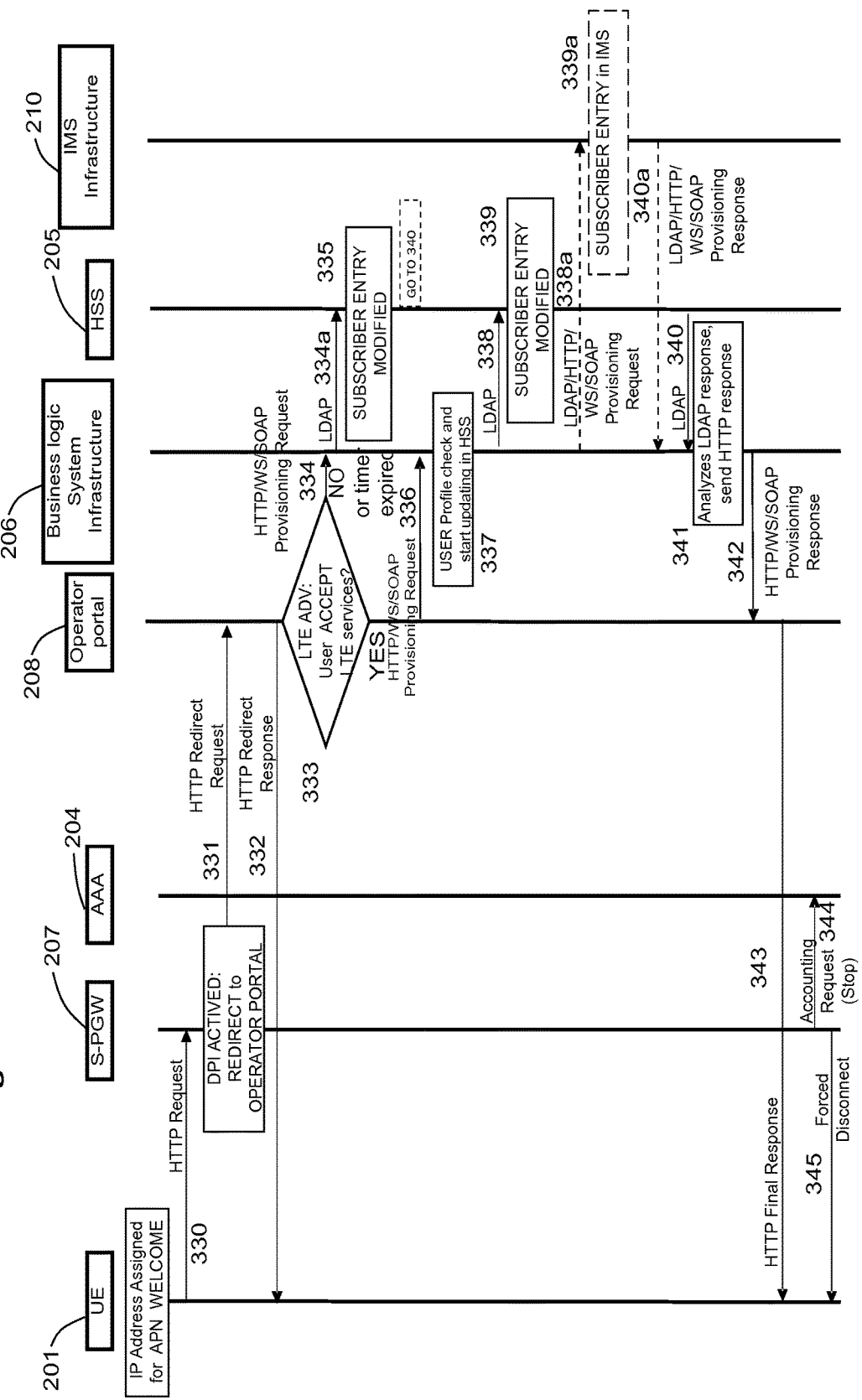

FIG. 5 shows the messages flow to manage a Web browsing session request of an auto-provisioned UE 201 on a default APN "APN WELCOME".

Specifically, at step 330 the UE 201 sends an HTTP Request message to the S-PGW 207 in order to start the establishment of the Web browsing session.

At step 331 the S-PGW 207, using a Deep Packet Inspection (DPI) functionality on the default APN "APN WELCOME", analyzes the data packets of the HTTP Request message so as to force the routing of these data packets towards the Operator Web Portal 208. Even if the UE 201 starts a Web browsing session towards a generic URL, it will be redirected to the URL of the Operator Web Portal 208. The availability of a Deep Packet Inspection (DPI) feature on the S-PGW 207 is assumed. In case this feature is not available, the functionality provided by an external DPI equipment can be used.

The Operator Web Portal 208, at step 332, sends an HTTP Redirect Response message to the UE 201 showing a Web page advertising (LTE ADV) in order to inform the user of the availability of LTE commercial services and to invite he/she to subscribe them.

The Operator Web Portal analyses the response of the user at step (decision block) 333. If the user does not accept LTE commercial services (exit branch NO of decision block 333), e.g. by quitting Web page or by doing an explicit rejection or because the Web page timer expires, the Operator Web Portal 208 notifies this event to the BLS 206 via a HTTP/WS/SOAP Provisioning Request message (step 334) including the UE 201 identity (e.g. IP, MSISDN, IMSI) inserted by the S-PGW 207 in the HTTP Redirect Request message (e.g. by using the HTTP Header Enrichment solution). Examples of protocols that may be used in step 334 are HyperText Transfer Protocol—HTTP—, Simple Object Access Protocol—SOAP—, Web Service—WS—Protocol).

Then at step 334a, the BLS 206 via LDAP modifies the default user LTE subscriber profile previously auto-provisioned (according to the procedure of FIG. 3) in the HSS 115.

Specifically, at step 335, the CC* value of the default LTE subscriber profile is replaced by the 3GPP-Charging Characteristics assigned to the user in the 2G/3G network. Other parameters such as AMBR/MBR and QCI can be modified according to TLC operator policies (e.g. to block further accesses of the UE 201 to the LTE network).

The TLC operator may decline the user request to subscribe LTE services if such user belongs to a corporate (i.e. in case the user does not correspond to a paying party). In this case steps 334a and 335 are not performed.

Otherwise, if the user accepts the LTE services (exit branch YES of decision block 333) the Operator Web Portal 208 notifies this event to the BLS 206 via a HTTP/WS/SOAP Provisioning Request message (step 336) including the UE 201 identity in the same manner as described above.

At a step 337, the BLS 206 checks if the user profile's type (e.g. consumer, business, prepaid or postpaid) is able to support the LTE services and, in the affirmative, via LDAP (step 338), the BLS 206 updates the default user LTE subscriber profile (step 339) previously auto-provisioned (according to the procedure of FIG. 3) in the HSS 115. The CC* value of the default LTE subscriber profile is replaced by the 3GPP-Charging Characteristics assigned to the user in the 2G/3G network. Other parameters such as APN, AMBR/MBR and QCI can be modified according to the LTE services previously chosen by the user (steps 332 and 333).

At the end of the updating of the LTE user profile (step 335 or step 339), the HSS 115 sends an LDAP result response (step 340) to the BLS 206.

If, at step 333, the user has requested/accepted also IMS services (e.g. VoLTE), the BLS 206 receives from the Operator Web Portal 208 via the HTTP/WS/SOAP Provisioning Request message (step 336) also this additional information. In this case, the BLS 206 requires to the IMS system 210 via LDAP/HTTP/WS/SOAP Provisioning Request (step 338a):

1. Subscription and/or updating of the user IMS profile in all databases of the IMS system 210 (e.g. HSS, SLF, DNS/ENUM, MMTEL AS, BGCF, . . . ).

2. Alignment in all databases of the IMS system 210 (e.g. MMTeL AS and HSS) of the user supplementary services just subscribed by the user in the circuit-switched network (e.g. call diversion, call hold, . . . ).

According to the message flows shown in FIG. 5, this provisioning activities are done through the mediation platform comprised in the IMS system 210 (step 339a). Optionally, this provisioning activities can be done directly by the BLS 206 on each database of the IMS system.

At the end of step 339a the IMS system 210 sends a LDAP/HTTP/WS/SOAP provisioning response message (step 340a) to the BLS 206.

At step 341, the BLS 206 analyses the LDAP/HTTP/WS/SOAP provisioning response message received from the HSS 115 and optionally also the LDAP/HTTP/WS/SOAP provisioning response message received from IMS system 210. Then the BLS 206 generates via Web page an HTTP final response to send to the UE 201 via the Operator Web Portal 208 (step 342 and step 343). Said HTTP final response contains the outcome of the subscription request.

If the outcome is positive, in order to allow the UE 201 to have access to the LTE services, the PDN connectivity with the default APN "APN WELCOME" should be broken down. For this purpose, the S-PGW 207, by means of the DPI functionality, recognizes the HTTP final response as a positive response and, at step 344, sends an Accounting Request (STOP) message to the AAA server 204 to release the resources assigned to the APN "APN WELCOME" (e.g. IP address) and then it forces a PDN disconnect to the UE 201 (step 345) to terminate the Web browsing session with the APN WELCOME. From now on, the UE 201 can have a free access to the LTE services by a commercial APN (i.e. the user of the UE 201 is no longer redirected towards APN APN WELCOME).

The description given here before is merely intended to provide examples of embodiments of the present invention. Other embodiments are possible and readily devisable by the person skilled in the art based on the teachings here provided.

The invention claimed is:

1. A method of managing access of users to services provided by mobile telecommunications network, comprising:
  receiving from a user equipment of a user, which user equipment is configured to support communications with the mobile telecommunications network, a request of authentication in the mobile telecommunications network;
  authenticating the user equipment in the mobile telecommunications network;
  before the authenticating and in case it is assessed that the authentication request received from the user equipment is a first attempt of that user equipment to register in the mobile telecommunications network, creating, in a network subscribers profiles database, a default subscriber profile for that user equipment, wherein the default subscriber profile includes a predetermined subscriber charging parameter used by the mobile telecommunications network for charging the user of the user equipment, and a predetermined Access Point Name; and
  after the authenticating, establishing a data connection with the user equipment using the predetermined subscriber charging value and the predetermined Access Point Name contained in the default subscriber profile.

2. The method of claim 1, wherein the request of authentication is received through an access network, the access network being either a 3GPP access network or a Non-3GPP access network, or a Trusted Non-3GPP access network or an Untrusted Non-3GPP access network.

3. The method of claim 1, further comprising, after the request of authentication is received and before the authenticating, assessing if the user equipment is allowed, by an operator of the mobile telecommunications network, to operate in the mobile telecommunications network, wherein the assessing is based on IMEI identities associated to the user equipment.

4. The method of claim 3, further comprising, after establishing a data connection with the user equipment, managing a Web browsing session request of the user equipment, wherein the managing the Web browsing session comprises:
  receiving from the user equipment a request to start a Web browsing sessions;
  assessing whether the request from the user equipment contains the default Access Point Name, and in an affirmative case, issuing to the user equipment a redirection response for the user towards a web page offering the services provided by the mobile telecommunications network;
  if the user accepts the services provided by the mobile telecommunications network, updating the default subscriber profile for the user equipment according to a subscriber profile for the user of the user equipment already assigned for mobile telecommunications networks other than the considered mobile telecommunications network;
  otherwise, if the user does not accept the services provided by the mobile telecommunications network, replacing the default subscriber charging value with a subscriber charging value already assigned for mobile telecommunications networks other than the considered mobile telecommunications network and updating subscriber attributes in HSS to block access of the user equipment to the considered mobile telecommunications network.

5. The method of claim 4, further comprising:
  if the user accepts the services provided by the mobile telecommunications network, requesting to an IP Multimedia Subsystem IMS to subscribe the user in the IP Multimedia Subsystem IMS, or to update an already existing user IMS profile, for being provisioned the services provided by the mobile telecommunications network.

6. The method of claim 1, wherein the establishing a data connection with the user equipment comprises:
  receiving a data connection request from the user equipment;
  assessing whether the subscriber profile associated with the user of the user equipment is a default subscriber profile, and in an affirmative case overriding an Access Point Name included in the received data connection request with the predetermined Access Point Name;
  accepting the data connection request and enabling the user device to access a data network through the predetermined Access Point Name.

7. The method of claim 6, wherein the assessing whether the subscriber profile associated with the user of the user equipment is a default subscriber profile comprises assessing whether the charging value associated with the user corresponds to the predetermined charging parameter.

8. The method of claim 7, wherein in case the charging value associated with the user does not correspond to the predetermined charging parameter, the Access Point Name included in the received data connection request is not overridden.

9. The method of claim 6, further comprising, after having assessed that the subscriber profile associated with the user of the user equipment is a default subscriber profile, sending to the user equipment a notification to inform the user of the user equipment about the subscription to services offered by the mobile telecommunications network.

10. The method of claim 6, wherein the assessing whether the subscriber profile associated with the user of the user equipment is a default subscriber profile is not performed in case it is assessed that the user equipment is connected to a 3GPP access network different from a fourth-generation access network.

11. The method of claim 10, further comprising, in case it is assessed that the user equipment is connected to a 3GPP access network different from a fourth-generation access network, assessing whether the user equipment is a fourthgeneration-capable equipment, and, in an affirmative case, creating an entry for the user equipment in the network subscribers profiles database.

12. The method of claim 11, wherein the assessing whether the user equipment is a fourth-generation-capable equipment comprises assessing whether the user equipment is connected to a cell, of the 3GPP access network different from a fourth-generation access network, being adjacent or near to a cell of a fourth-generation access network.

13. A mobile telecommunications network, comprising:
a network subscribers profiles database configured to:
upon receipt, from a user equipment of a user, which user equipment is capable of supporting communications with the mobile telecommunications network, a request of authentication in the mobile telecommunications network, before authenticating the user equipment in the mobile telecommunications network and in case it is assessed that the authentication request received from the user equipment is the first attempt of that user equipment to register in the mobile telecommunications network, create, in the network subscribers profiles database, a default subscriber profile for that user equipment, wherein the default subscriber profile comprises a predetermined subscriber charging parameter used by the network for charging the user of the user equipment, and a predetermined Access Point Name; and
an Authorization, Authentication, and Accounting network function for establishing a data connection with the user equipment using the predetermined subscriber charging parameter and the predetermined Access Point Name.

14. The mobile telecommunications network of claim 13, further comprising an access network through which the request of authentication is received through, wherein the access network comprises at least one of a 3GPP access network and a Non-3GPP access network, or a Trusted Non-3GPP access network or an Untrusted Non-3GPP access network.

15. The mobile telecommunications network of claim 13, wherein the Authorization, Authentication, and Accounting network function is configured to assess whether the subscriber profile associated with the user of the user equipment is a default subscriber profile, and in an affirmative case overriding an Access Point Name included in the received data connection request with the predetermined Access Point Name.

16. The mobile telecommunications network of claim 15, wherein, for the assessing whether the subscriber profile associated with the user of the user equipment is a default subscriber profile, the Authorization, Authentication, and Accounting network function is configured to assess whether the charging value associated with the user corresponds to the predetermined charging parameter.

17. The mobile telecommunication network of claim 13, further comprising a network function, or a Diameter Proxy, configured to assess whether the use equipment is allowed, by an operator of the mobile telecommunications network, to perform authentication in the mobile telecommunications network.

* * * * *